US008260931B2

(12) United States Patent
Balasubramanian et al.

(10) Patent No.: US 8,260,931 B2
(45) Date of Patent: Sep. 4, 2012

(54) SECURE PROVISIONING OF RESOURCES IN CLOUD INFRASTRUCTURE

(75) Inventors: Ramakrishnan Balasubramanian, Santa Clara, CA (US); Suman Chakravartula, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/019,902

(22) Filed: Feb. 2, 2011

(65) Prior Publication Data
US 2012/0084847 A1    Apr. 5, 2012

Related U.S. Application Data

(60) Provisional application No. 61/389,227, filed on Oct. 2, 2010.

(51) Int. Cl.
*G06F 15/173* (2006.01)
*G06F 15/16* (2006.01)

(52) U.S. Cl. ............... 709/226; 709/225; 709/229

(58) Field of Classification Search .............. 709/226, 709/225, 229
See application file for complete search history.

(56) References Cited

U.S. PATENT DOCUMENTS

| 5,978,476 | A * | 11/1999 | Redman et al. .......... 705/51 |
|---|---|---|---|
| 7,269,848 | B2 | 9/2007 | Seshadri |
| 7,353,467 | B2 * | 4/2008 | Robertson et al. ...... 716/138 |
| 7,353,468 | B2 * | 4/2008 | Ferguson et al. ....... 716/102 |
| 7,698,664 | B2 * | 4/2010 | Ferguson et al. ....... 716/100 |
| 7,827,598 | B2 * | 11/2010 | Moran et al. ............ 726/4 |
| 7,855,972 | B2 * | 12/2010 | Pettit et al. ............. 370/252 |
| 7,890,640 | B2 * | 2/2011 | Ribot ...................... 709/229 |
| 7,941,840 | B2 * | 5/2011 | Foster et al. ............ 726/14 |
| 7,975,287 | B2 * | 7/2011 | Hung .................... 726/2 |
| 7,979,899 | B2 * | 7/2011 | Guo et al. ............... 726/7 |
| 7,984,152 | B2 * | 7/2011 | Anschutz et al. ....... 709/226 |
| 2010/0169497 | A1 | 7/2010 | Klimentiev et al. |
| 2010/0235630 | A1 | 9/2010 | Carter et al. |
| 2010/0299763 | A1 | 11/2010 | Marcus et al. |

OTHER PUBLICATIONS

Dalpasso, M. et al., "Virtual Simulation of Distributed IP-Based Designs," IEEE Design & Test of Computers, 36th proceedings of Design Automation Conference, 1999, pp. 50-55.
Guajardo, J. et al., "Secure IP-Block Distribution for Hardware Devices," IEEE International Workshop on Hardware-Oriented Security and Trust, HOST '09, Jul. 27, 2009, pp. 82-89.

* cited by examiner

*Primary Examiner* — Kristie Shingles
(74) *Attorney, Agent, or Firm* — Fenwick & West LLP

(57) ABSTRACT

Provisioning resources in public cloud infrastructure to perform at least part of electronic design automation (EDA) tasks on the public cloud infrastructure. The provisioning of resources is handled by a cloud provisioning system that is generally operated and maintained by an EDA tool developer using a provisioning credential. After the resources are provisioned, the cloud provisioning system places user key on the provisioned resources. Once the user key is placed on the provisioned resources, the cloud provisioning system has only limited access or no access to the provisioned resources. Instead, a user client device takes over the control of the provisioned resources by using a user's access credential. The provisioning credential is retained by the EDA tool developer and is not released to the user. Similarly, the access credential is retained by the user and not released to the EDA tool developer. In this way, the EDA tool developer can retain control of the resources deployed for the EDA tasks while ensuring that the user's information associated with the EDA tasks is secure.

15 Claims, 5 Drawing Sheets

SECURE PROVISIONING OF RESOURCES IN CLOUD INFRASTRUCTURE

CROSS-REFERENCE TO RELATED APPLICATIONS

This application claims priority under 35 U.S.C. §119(e) to U.S. Provisional Patent Application No. 61/389,227 entitled "Secure Provisioning of Resources in Cloud Infrastructure" filed on Oct. 2, 2010, which is incorporated by reference herein in its entirety.

BACKGROUND

1. Field

This disclosure relates generally to provisioning resources on public cloud infrastructure or hybrid cloud infrastructure to perform electronic design automation (EDA) tasks.

2. Description of the Related Art

An electronic design automation (EDA) refers to software tools or processes of designing integrated circuit (IC) devices with the aid of computing devices. An EDA process generally includes, for example, system design operations, logic design and functional verification, synthesis, netlist verification, design planning, physical implementation, analysis and extraction, physical verification, resolution enhancement, and mask data preparation. EDA tools dedicated to one or more of these tasks are commercially available from EDA tool developers such as Synopsys, Inc. of Mountain View, Calif. Generally, the EDA tool developers grant licenses to use the EDA tools in return for licensing fees. The licensing fees increase as the number and types of accessible EDA tools increase.

As more components are integrated into an IC device and more functions are accommodated in the IC device, some EDA task sets have come to require a large amount of computing and storage resources. Some EDA task sets may take days, weeks or even months to complete. To reduce such an extended runtime or meet other constraint conditions, EDA task sets may be divided into multiple smaller EDA tasks and then executed on multiple computing resources (e.g., servers) in parallel. Some EDA tasks may take longer to finish while other EDA tasks may finish in relatively short time. Also, accomplishment of an EDA task may be a prerequisite to performing another EDA task. Hence, a careful planning of the EDA tasks is needed to accomplish the EDA tasks within the constraint conditions.

Cloud computing distributes information and software on multiple computers connected by a network (e.g., Internet) and provided to users on demand. The users are often charged based on the types of hardware or software resources leased, and the lengths of time these resources are leased. The cloud computing enables the users to efficiently use the computing resources by eliminating or reducing the time and expense associated with provisioning and maintaining private server farms.

Although EDA tasks may also be performed in various types of cloud computing environment, EDA tool users are sensitive to security concerns as the EDA information or design information is often a significant asset to the EDA tool users. Due to the very nature of public cloud infrastructure, the EDA tool users are often concerned about the security of their information uploaded and processed in the public cloud infrastructure. The security concern of user's EDA information has delayed wide adoption of public or hybrid cloud computing in EDA industries.

SUMMARY

Embodiments relate to provisioning computing resources in a public computing infrastructure to perform electronic design automation (EDA) tasks where the computing resources are provisioned using a provisioning credential, and then accessed by an access credential. The provisioning credential is retained by a first party responsible for provisioning the resources whereas the access credential is retained by a second party authorized to access and use the provisioned resources. After the resources are provisioned by the first party, provisioning information is sent to the second party having the access credential. After provisioning of resources, the first party no longer has access to the provisioned resources. In this way, the second party can be assured that EDA information of the second party is not accessed or misappropriated by the first party.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE EMBODIMENTS

Figure 1:
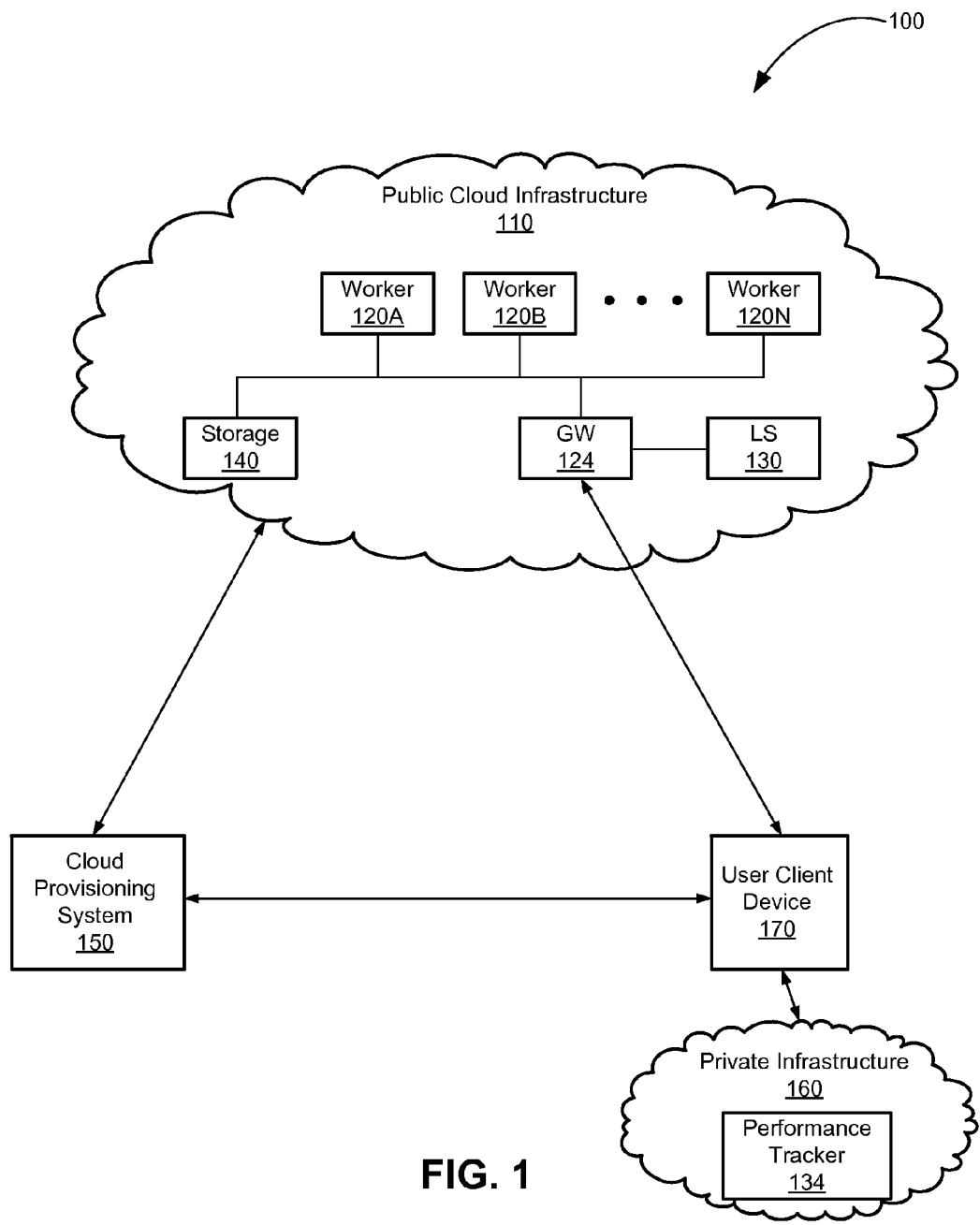
FIG. 1 is a diagram illustrating the architecture of a cloud computing system for performing electronic design automation (EDA) tasks, according to one embodiment.

The Figures and the following description relate to preferred embodiments by way of illustration only. It should be noted that from the following discussion, alternative embodiments of the structures and methods disclosed herein will be readily recognized as viable alternatives that may be employed without departing from the principles of the disclosure.

Reference will now be made in detail to several embodiments, examples of which are illustrated in the accompanying Figures. It is noted that wherever practicable similar or like reference numbers may be used in the Figures and may indicate similar or like functionality. The Figures depict embodiments for purposes of illustration only. One skilled in the art will readily recognize from the following description that alternative embodiments of the structures and methods illustrated herein may be employed without departing from the principles described herein.

Embodiments relate to provisioning resources in public cloud infrastructure to perform at least part of electronic design automation (EDA) tasks on the public cloud infrastructure. The provisioning of resources is handled by a cloud provisioning system that is operated and maintained by a first party (e.g., an EDA tool developer) using a provisioning credential. After the resources are provisioned, the cloud provisioning system places a user key on the provisioned resources. Once the user key is placed on the provisioned resources, the cloud provisioning system or the first party has only limited access or no access to the provisioned resources. Instead, a user client device operated and maintained by a second party (e.g., a user) takes over the control of the provisioned resources using a user's access credential. The provisioning of resources and using the provisioned resources are separated by having two different types of credentials: the provisioning credential and the user's access credential.

A provisioning credential described herein refers to information used for authorizing an entity to provision resources in public cloud infrastructure. The provisioning credential may be embodied using various schemes including, but not limited to, a combination of a user ID and password, and a digital certificate. In one embodiment, the provisioning credential enables the associated entity to provision the resources but the disables access to the public cloud infrastructure for processing information using the provisioned resources or retrieving the processed information from the provisioned resources before the provisioning credential is delivered to the associated entity.

An access credential described herein refers to information for accessing the provisioned resources for uploading information to the provisioned resources, processing the information at the provisioned resources and receiving the processed information from the provisioned resources. The access credential may also be embodied using various schemes including, but not limited to, a combination of a user ID and password, and a digital certificate.

Architecture and Overall Function of Cloud Computing System

FIG. 1 is a diagram illustrating the architecture of a cloud computing system 100 for performing electronic design automation (EDA) tasks, according to one embodiment. The cloud computing system 100 may include public cloud infrastructure 110, a cloud provisioning system 150, a user client device 170 and private infrastructure 160. In one embodiment, these components are located remotely from each other and communicate over channels established in a network (e.g., Internet). In other embodiments, some of the components of the cloud computing system 100 may be located on the same premise. The components in the same premise communicate over a local area network (LAN). For example, the user client device 170 and the private infrastructure may be located on the same premise.

The public cloud infrastructure 110 may include, among others, computing resources and storage resources that may be provisioned for a user according to the user's demand. The public cloud infrastructure 110 may be managed by cloud vendors such as Amazon.com, Inc. (of Seattle, Wash.) and RackSpace US, Inc. (of San Antonio, Tex.). These vendors may charge customers for the metered use of computing resources based on the time period and types of the leased resources. In many cases, the vendors charge fees for the lease of resource on an hourly basis.

The public cloud infrastructure 110 may include more than one type of servers with different performance profiles. Higher performance servers are likely to be charged at a higher price compared to lower performance counterparts. The resources in the public cloud infrastructure may be provisioned using an interface (not shown) provided by the vendors. The resources in the public cloud infrastructure 110 may be leased to multiple different users.

The cloud provisioning system 150 is hardware, software, firmware or a combination thereof for provisioning resources in the public cloud infrastructure 110 adapted to perform EDA tasks, as described below in detail with reference to FIG. 3. The cloud provisioning system 150 provisions the resources for a user and allows the user to access the provisioned resources. The cloud provisioning system 150 stores information associated with servers capable of performing an EDA task, cost structure of using the public cloud infrastructure 110, and performance metrics of resources in the private infrastructure 160 and the public cloud infrastructure 110. The cloud provisioning system 150 develops a provisioning plan for deploying appropriate resources in a cost efficient manner in the public cloud infrastructure 110.

In one embodiment, the cloud provisioning system 150 is operated by EDA tool developers such as Synopsys, Inc. of Mountain View, Calif. Operating of the cloud provisioning system 150 by the EDA tool developers is advantageous, among other reasons, because (i) the EDA tool developers possess knowledge and information associated with optimally provisioning resources for their EDA tools, (ii) the EDA tool developer may control type of resources deployed for EDA tasks under a licensing agreement with a user, and (iii) the EDA tool developers may ensure that no resources incompatible with the EDA tasks are deployed in the public cloud infrastructure 110.

The user client device 170 is hardware, software, firmware or a combination thereof for interfacing with the user to perform EDA tasks, as described below in detail with reference to FIG. 4. The user client device 170 communicates with the cloud provisioning system 150 and the provisioned resources in the public cloud infrastructure 110. The user client device 170 may also communicate with private infrastructure 160 to perform EDA tasks on the private infrastructure 160.

The private infrastructure 160 includes computing and storage resources that are privately operated by a user and are not accessible by other users. The private infrastructure 160 in conjunction with the public cloud infrastructure 110 forms hybrid cloud infrastructure. An EDA task set may be divided into multiple EDA tasks. Each EDA task can then be distributed to different resources in the public cloud infrastructure 110 and the private infrastructure 160 for fast and cost-efficient processing. The private infrastructure 160 may include a performance tracker 134 that evaluates the individual or collective performance characteristics of resources in the private infrastructure 160.

In an alternative embodiment, the cloud computing system 100 does not include the private infrastructure 160. In this embodiment, all EDA tasks are assigned to and performed on the public cloud infrastructure 110.

Example of Provisioned Resources

FIG. 1 also illustrates an example of resources provisioned in the public cloud infrastructure 110. The provisioned resources may include, for example, a gateway server 124, a licensing server 130, a storage device 140, and workers 120A through 120N (hereinafter collectively referred to as the "workers 120"). During the provisioning process, the cloud provisioning system 150 provisions appropriate servers and loads these servers with corresponding software programs and EDA tools.

The gateway server 124 is hardware, software, firmware or a combination thereof for performing various operations including, but not limited to, (i) communicating with the user client device 170, (ii) monitoring the operation status of the workers 120, (iii) distributing EDA tasks to the workers 120, and (iv) requesting the provisioning of additional workers, if needed. The gateway server 124 is described below in detail with reference to FIG. 2. In one embodiment, the user's access to provisioned resources in the public cloud infrastructure 110 is made solely via the gateway server 124.

The licensing server 130 authorizes check-out of licenses for operating EDA tools that are deployed and operated on the workers 120. The licensing server 130 may be a proxy of a central licensing server 130 maintained and operated by an EDA tool developer. The licensing server 130 imposes licensing restrictions such as the maximum number of EDA tools or the type of EDA tools that can be loaded onto the workers 120 at a time. The licenses are checked-in after an EDA task is terminated.

The storage device 140 stores information associated with the EDA tasks. Access to the storage device 140 is shared by the workers 120. The storage device 140 may store, among other information, source data for initiating the EDA tasks and intermediate data generated by operations performed at the workers 120.

The workers 120 are hardware, software, firmware or a combination thereof for performing EDA tasks. An EDA task set is divided into a smaller EDA tasks and assigned by the gateway server 124 to the workers 120 for parallel processing. The workers 120 are loaded with EDA tools and the user's EDA information (e.g., netlist) for performing the assigned EDA tasks. In one embodiment, each worker 120 has multiple slots where each slot can accommodate one EDA task. For example, each worker 120 has four slots to perform four EDA tasks in parallel. After initial provisioning of the workers 120, additional workers may be provisioned or decommissioned according to the workload.

Figure 2:
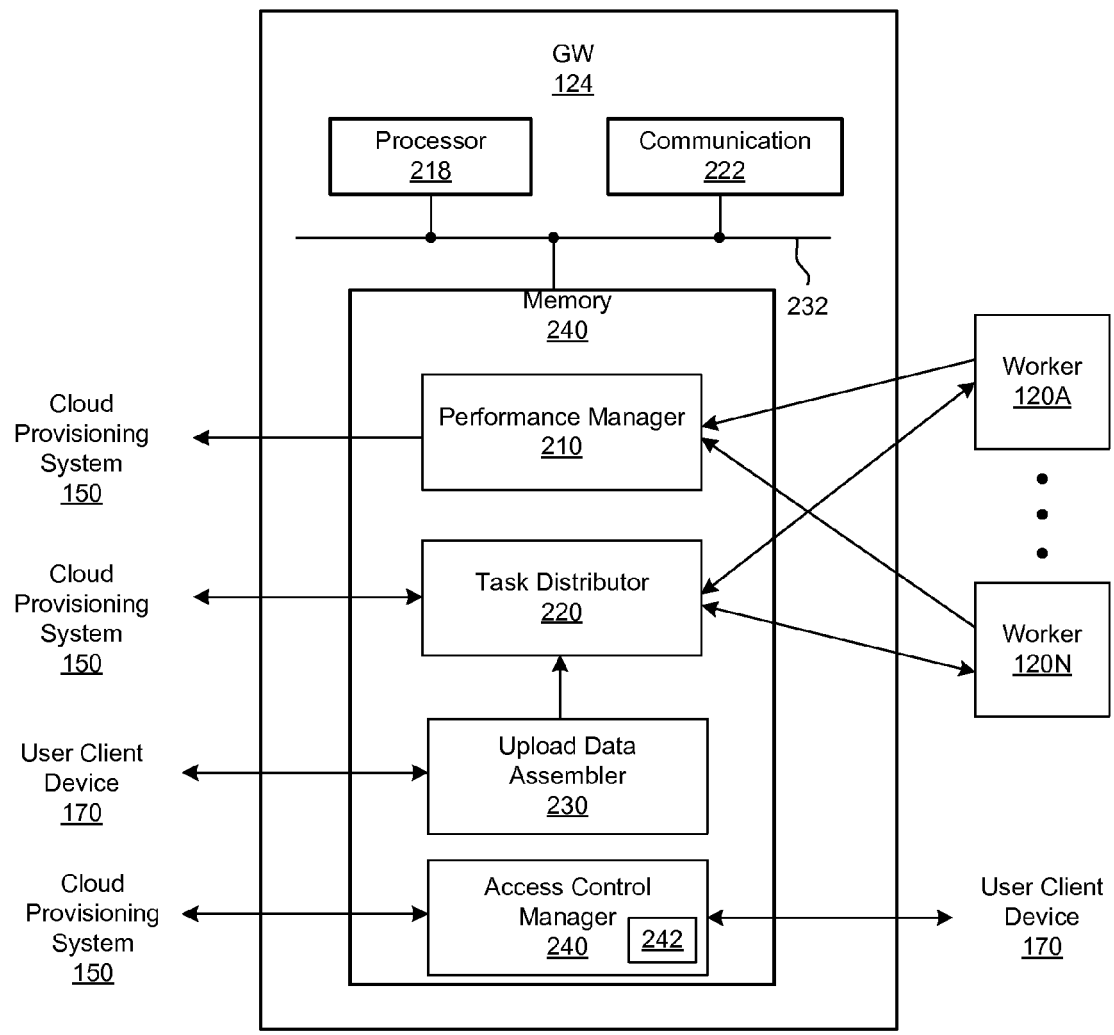
FIG. 2 is a block diagram of a gateway server, according to one embodiment.

FIG. 2 is a block diagram of the gateway server 124, according to one embodiment. The gateway server 124 may include, among other components, a processor 218, a communication module 222, memory 240 and a bus 232 for connecting these components. The processor 218 executes computer instructions stored in the memory 240. The communication module 222 is hardware, software, firmware or a combination thereof for communicating with other components of the cloud computing system 100. In one embodiment, the communication module 222 is embodied as a network card.

The memory 240 is a computer-readable storage medium for storing software modules. The memory 240 may include, among other modules, a performance manager 210, a task distributor 220, an upload data assembler 230 and an access control manager 240. Although these modules are illustrated in FIG. 2 as communicating directly with the workers 120, the cloud provisioning system 150 and the user client device 170, in practice, the software modules in the memory 240 communicates with the workers 120, the cloud provisioning system 150 and the user client device 170 via the communication module 222. Further, one or more software modules in the memory 240 may be installed and be executed on a server other than the gateway server 124.

The performance manager 210 monitors the performance characteristics of EDA tasks on the workers 120. The performance manager 210 then sends performance metrics of the workers 120 or a group of workers 120 to the cloud provisioning system 150. The performance metrics may include, for example, runtime of the EDA tasks, CPU and memory utilization of the server and the task and resource utilization patterns.

The task distributor 220 detects the workload and keeps track of remaining lease time of the workers 120. Based on the tracked workload status of the workers 120, the task distributor 220 assigns new EDA tasks to the workers 120. The task distributor 220 may also communicate with the cloud provisioning system 150 to provision additional workers 120 or decommission unnecessary workers 120. The decommissioning may be performed by, for example, not extending the lease time of the worker.

The upload data assembler 230 communicates with the user client device 170 to receive and assemble the EDA information from the user client device 170. The uploaded EDA information may be distributed to relevant workers 120. The user client device 170 and the gateway server 124 may communicate over multiple channels. The upload data assembler 230 assembles segments of a file or multiple files communicated over the multiple channels for distribution. The assembled file or files may be stored in the storage device 140 for access by the workers 120.

The access control manager 240 manages access to the provisioned resources. The access control manager 240 stores the user's key 242 received from the cloud provisioning system 150. The access control manager 240 then authorizes the user with an access credential that corresponds to the public key 242. The gateway 124 controls the user's access and use of other resources provisioned in the public cloud infrastructure 110.

Example Cloud Provisioning System

Unlike typical operations generally performed on a public cloud infrastructure such as webpage hosting, some EDA tasks require high performance servers while other EDA tasks can be performed on low performance servers. The EDA users may not have sufficient knowledge or information to provision appropriate resources for EDA tasks in a cost-effective manner. On the other hand, the EDA tool developers may possess knowledge and information for provisioning necessary resources in a cost efficient manner but EDA tool developers generally are not given access to the user's EDA tasks or EDA information. The EDA tool developers also do not have information about the performance characteristics of the private infrastructure of the user. Hence, the cloud provisioning system 150 receives and processes available description about the EDA tasks and information about the private infrastructure to provision appropriate types and number of resources in the public cloud infrastructure 110 sufficient to accomplish the EDA tasks within the constraint conditions while minimizing the overall cost associated with the provisioned resources.

Figure 3:
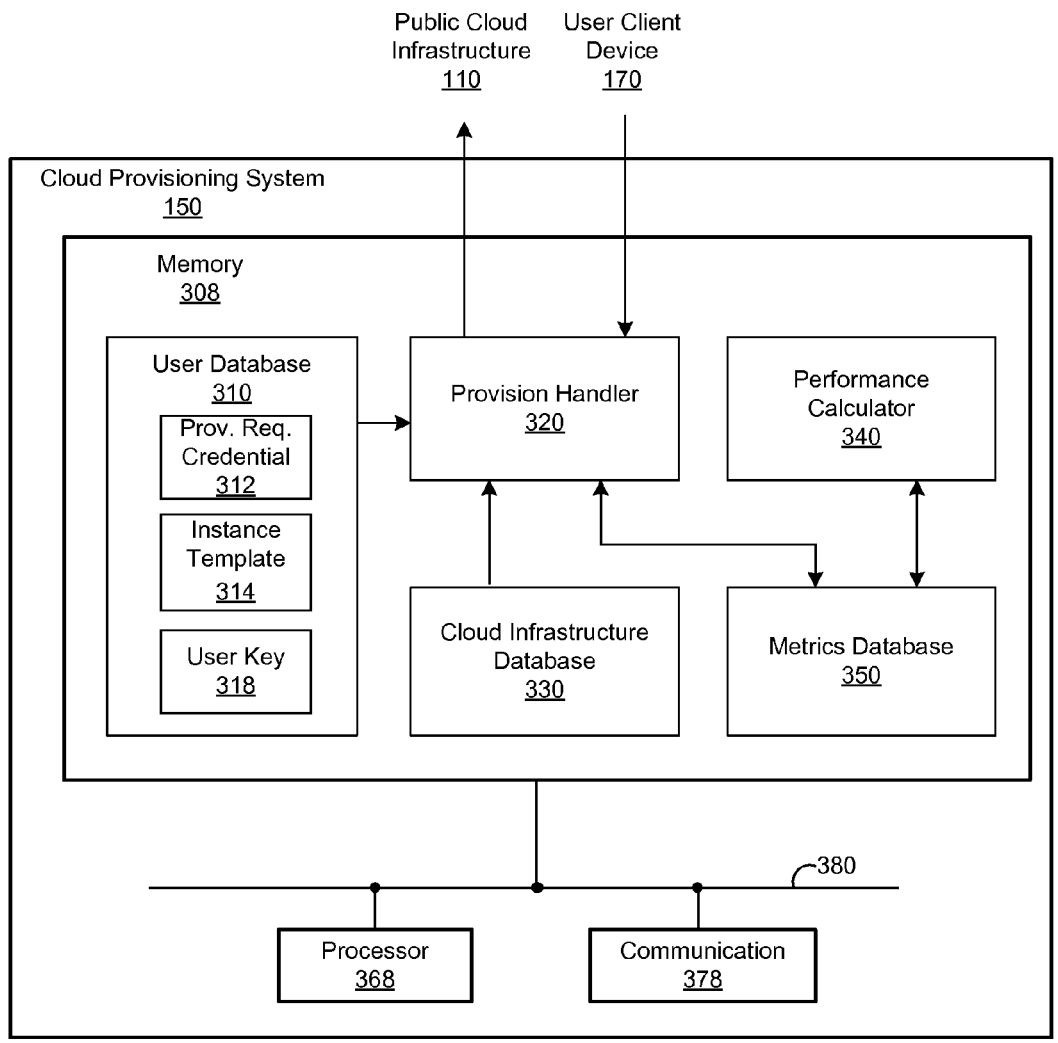
FIG. 3 is a block diagram of a cloud provisioning system, according to one embodiment.

FIG. 3 is a block diagram of the cloud provisioning system 150, according to one embodiment. The cloud provisioning system 150 may include, among other components, a processor 368, a communication module 378, memory 308 and a bus 380 connecting these components. The processor 368 executes instructions stored in the memory 308. The communication module 378 enables the cloud provisioning system 150 to communicate with other components of the cloud computing system 100 via a network. The cloud provisioning system 150 may also include other components not illustrated in FIG. 3 such as input modules or output modules.

The memory 308 may store, among other software modules, a user database 310, a provision handler 320, a cloud infrastructure database 330, a performance calculator 340 and a metrics database 350. The user database 310 stores data associated with users such as: (i) the user identity, (ii) user provision request credential 312 (e.g., password), (iii) an instance template 314 and (iv) usage metrics showing patterns of resource usage.

A user's provision request credential 312 allows the users to log on to the cloud provisioning system 150. The provision request credential may be a combination of the user identity and the authentication information (e.g., password). The instance template 314 describes a default configuration of resources to be provisioned at the public cloud infrastructure 110 for a user. The instance template 314 can describe, for example, the number of maximum workers, the identity of user's preferred public cloud vendor, master configuration of resources (e.g., the gateway server 124 and the licensing server 130), geographic zones associated with the user, and public keys of the users for accessing the public cloud infrastructure.

In one embodiment, the user database 310 further stores user key 318 for each user. After the provision handler 320 provisions resources in the public cloud infrastructure 110, the user key 318 is sent to one or more provisioned resources to associate the provisioned resources with the user. The user may access the provisioned resources associated with the user's key using the user's access credential.

The default configuration of resources may be modified depending on the EDA tasks or other information (e.g., constraint conditions) received from the user client device 170.

The provision handler 320 determines the resources to be provisioned based on performance metrics of resources and the constraint conditions.

The cloud infrastructure database 330 stores information associated with the public cloud infrastructure 110 including, but not limited to, costs associated with different types or categories of resources available for lease in the public cloud infrastructure 110 and credentials for accessing the public cloud infrastructure 110, and the performance ratio representing performance characteristics of a computing resource in the public computing infrastructure 110 relative to a computing resource in private infrastructure 160.

The metrics database 350 stores performance metrics associated with the performance characteristics of resources in the public cloud infrastructure 110 and the private infrastructure 160. The performance metrics of the private infrastructure 160 or its component resources may be received from the performance tracker 134 (refer to FIG. 1). The performance metrics of the public cloud infrastructure 110 or its component resources may be received from the gateway server 124 (refer to FIG. 1). The performance metrics can include performance information at one or more levels of granularity. The performance metrics may indicate, for example, (i) performance characteristics of a single server, (ii) performance characteristics of a subset of servers in public cloud infrastructure 110 or the private infrastructure 160, and (iii) performance characteristics of collective resources in the private infrastructure 160 or public cloud infrastructure 110. The metrics database 350 also stores history or statistical information of a user's previous EDA tasks performed on the private infrastructure 160 and/or the public cloud infrastructure 110.

The performance calculator 340 calculates a performance ratio between resources in the public cloud infrastructure 110 and the private infrastructure 160. The performance ratio represents the difference in the computing or processing performance characteristics of the resources in the public cloud infrastructure 110 and the private infrastructure 160. Since the performance characteristics of the public cloud infrastructure 110 vary depending on the provisioned resources, the performance calculator 450 may determine the performance ratio based on information about the provisioned resources. The performance ratio may also have one or more levels of granularity. The performance ratio may indicate the difference in the computing or processing capabilities of individual servers, a subset of servers or the provisioned servers as a whole. The performance ratio may be measured using several atomic parameters or by a linear combination or mapping of several parameters to each other. The performance ratio is also applicable to individual tasks, part of the tasks or to the entire set of tasks (i.e., workload).

In one embodiment, the performance ratio computed at the performance calculator 340 is stored in the metrics database 350. The provision handler 320 may access the performance ratio stored in the metrics database 350 to estimate the operation parameters when the EDA tasks are executed on the public cloud infrastructure 110 and the private infrastructure 160.

Example User Client Device

Figure 4:
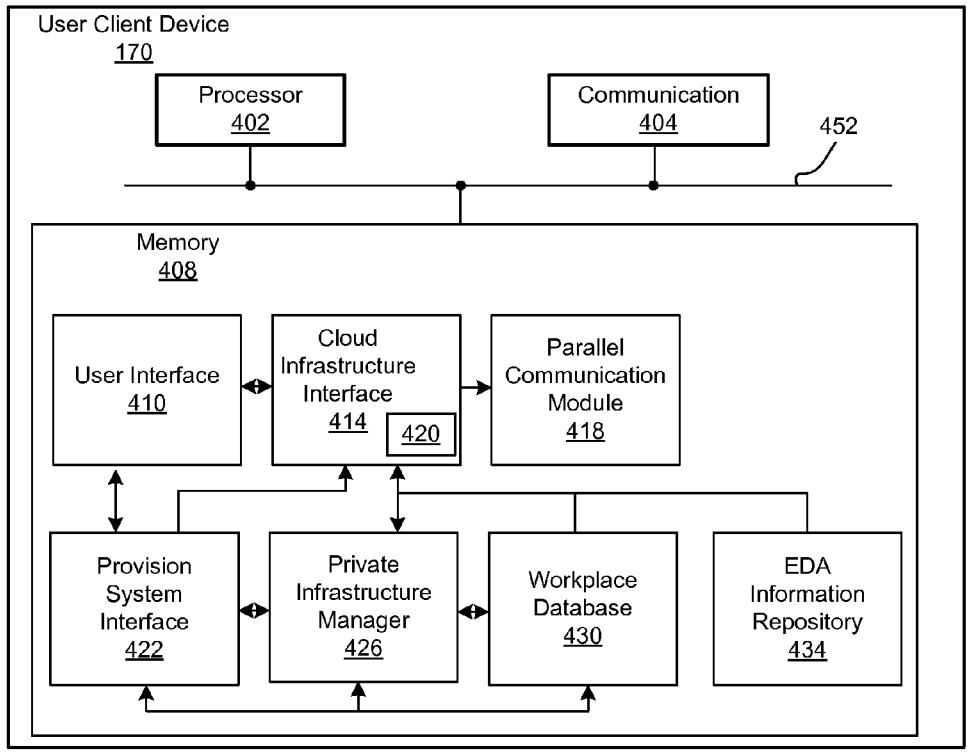
FIG. 4 is a block diagram of a user client device, according to one embodiment.

FIG. 4 is a block diagram of the user client device 170, according to one embodiment. The user client device 170 may include, among other components, a processor 402, a communication module 404, memory 408 and a bus 452 for connecting these components. The processor 402 executes instructions stored in the memory 408. The communication module 404 communicates with other components of the cloud computing system 100 via a network or a communication channel. The user client device 170 may include other components not illustrated in FIG. 4 such as an input device or a display device.

The memory 408 may store, for example, a user interface 410, a cloud infrastructure interface 414, a parallel communication module 418, a provision system interface 422, a private infrastructure manager 426, a workplace database 430 and an EDA information repository 434. The user interface 410 allows the user to provide inputs and view information associated with the EDA tasks. In one embodiment, the user interface 410 is an Internet browser.

The cloud infrastructure interface 414 enables the user client device 170 to communicate with the public cloud infrastructure 110. The cloud infrastructure interface 414 stores the user's access credential 420 for accessing the resources in the public cloud infrastructure 110. Using the access credential 420, the cloud infrastructure interface 414 initiates a session with the cloud infrastructure interface 414 to upload the EDA information from the EDA information repository 434 to the workers 120 in the public cloud infrastructure 110.

The parallel communication module 418 sends EDA information in the form of segmented data packets to the public cloud infrastructure 110 using multiple channels between the public cloud infrastructure 110 and the user client device 170. The parallel communication module 418 plans and coordinates communication of the EDA information with the gateway server 124.

The provision system interface 422 communicates with the cloud provisioning system 150 to send provision requests and receive information for accessing the provisioned resources. The provision system interface 422 may also send performance metrics of the private infrastructure 160 to the cloud provisioning system 150.

The private infrastructure manager 426 communicates with the private infrastructure 160 to perform various operations (e.g., EDA tasks) on the private infrastructure 160. The private infrastructure manager 426 may also collect performance metrics of the private infrastructure manager 426 after an EDA task is terminated. The performance metrics is sent to the cloud provisioning system 150 via the provision system interface 422 to update past or statistical performance information related to performance characteristics of the private infrastructure 160.

The workplace database 430 stores assignment of each EDA task to the public cloud infrastructure 110 or the private infrastructure 160. Based on assignment information of the workplace database 430, the private infrastructure manager 426 and the cloud infrastructure interface 414 upload the corresponding EDA information to the private infrastructure 160 or the public cloud infrastructure 110, respectively.

The EDA information repository 434 stores EDA information for performing the EDA tasks. The EDA information may include, for example, the netlist of a circuit design and various design parameters associated with verification processes. The private infrastructure manager 426 and the cloud infrastructure interface 414 selectively loads the EDA information to the private infrastructure manager 426 or the cloud infrastructure interface 414 as defined in the workplace database 430.

Credential Establishment

Figure 5:
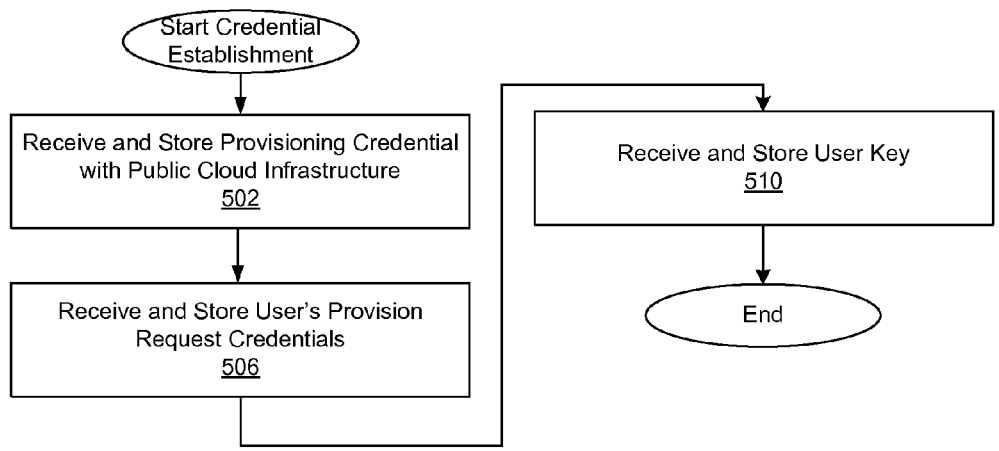
FIG. 5 is a flowchart illustrating a process of establishing credentials for provisioning and accessing resources on public cloud infrastructure, according to one embodiment.

FIG. 5 is a flowchart illustrating the process of establishing credentials associated with performing the EDA tasks in the cloud computing system 100, according to one embodiment. The operator of the cloud provisioning system 150, typically an EDA tool developer, enters into an agreement with the vendor of the public cloud infrastructure 110. In one embodiment, the agreement allows the operator of the cloud provisioning system 150 limited access to the public cloud infrastructure 110 for provisioning purposes. A provisioning credential is established for the cloud provisioning system 150 as a result of the agreement. The provisioning credential is received and stored 502 in the cloud provisioning system 150 to enable the public cloud infrastructure 110 to access the public cloud infrastructure 110 for the purpose of provisioning the resources.

The user establishes a user's provisioning credential for accessing the cloud provisioning system 150. The provisioning credentials enables the user to access the cloud provisioning system 150 to send a request to provision the resources in the public cloud infrastructure 110 and information related to provisioning (e.g., description of tasks to be performed on the public cloud infrastructure 110). The provisioning credentials are received and stored in the cloud provisioning system 150.

The user also establishes an account for using the public cloud infrastructure 110. After establishing the account, a user key and a user access credential are generated. The user key is received and stored 510 in the cloud provisioning system 150. As described above in detail with reference to FIG. 3, the user key is placed in or associated with the resources provisioned for the user. The user access credential is retained by the user and not shared with the operator of the cloud provisioning system 150 for security purposes. The user access credential is associated with the user key so that the user can access the provisioned resources in the public cloud infrastructure 110 using the user access credential.

The sequence and steps illustrated in FIG. 5 are merely illustrative. The steps as illustrated in FIG. 5 may be in a different sequence. For example, receiving and storing 502 provisioning credential may be performed after receiving and storing 506 the user's provision request credential.

Example Process of EDA Operation on Cloud Computing System

Figure 6:
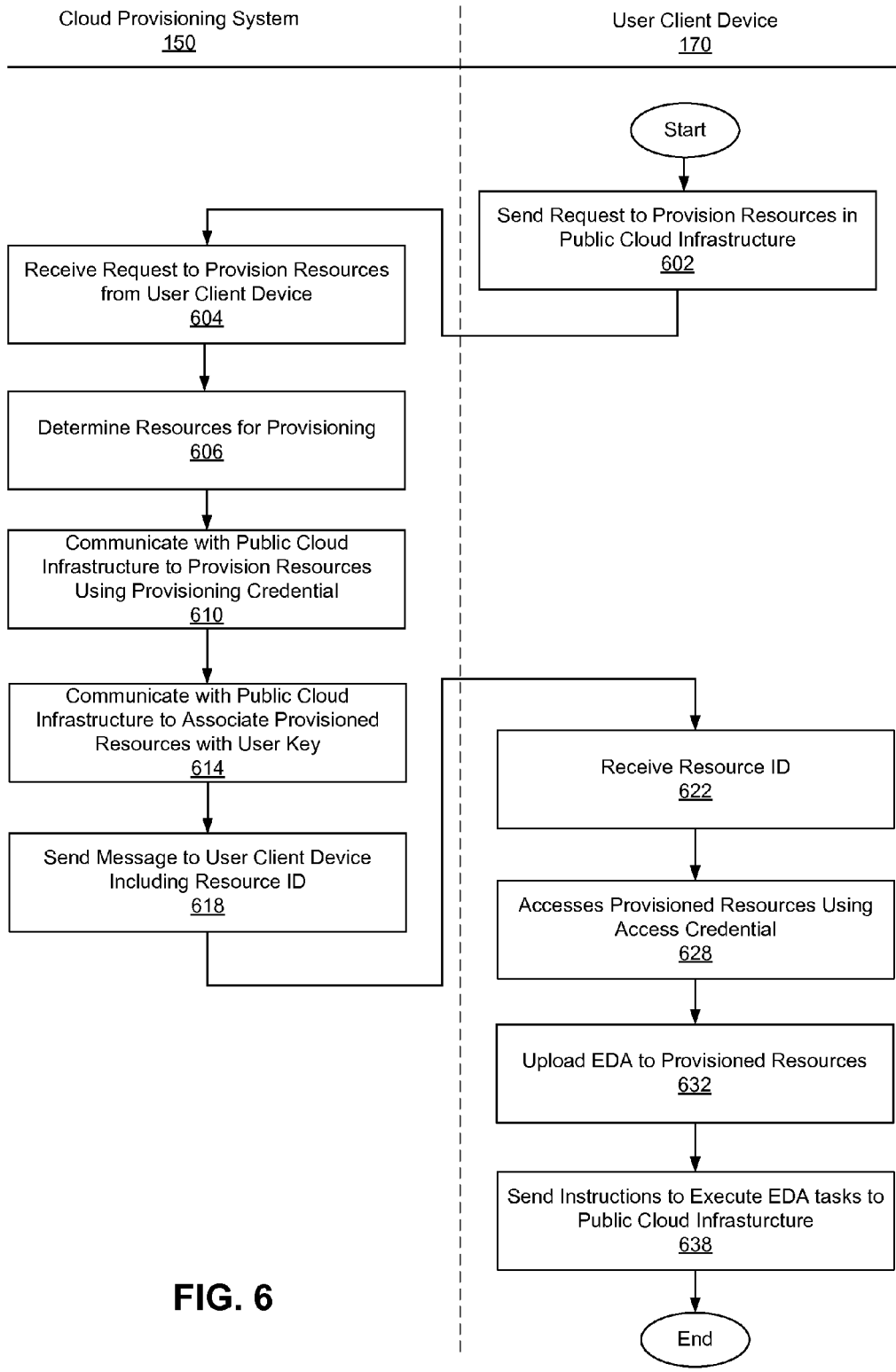
FIG. 6 is a flowchart illustrating a process of provisioning and accessing resources on the public cloud infrastructure, according to one embodiment.

FIG. 6 is a flowchart illustrating a process of provisioning and accessing resources on the public cloud infrastructure 110, according to one embodiment. After EDA tasks are assigned to public cloud infrastructure 110, the user client device 170 sends 602 a provisioning request to the cloud provisioning system 150 using the user's provision request credential. The cloud provisioning system 150 receives 604 the request to provision the resources. The cloud provisioning system then determines 606 the types and amounts of resources to be provisioned in the public cloud infrastructure 110.

Then, the cloud provisioning system 150 communicates 610 with the public cloud infrastructure 110 to provision resources for performing the EDA tasks. The cloud provisioning system 150 uses the provisioning credential to perform the provisioning operation. Since the provisioning of the resources is performed by the cloud provision system 150, the operator (typically the EDA tool developer) of the cloud provisioning system 150 may have a tight control over the resources to be provisioned. That is, the operator of the cloud provisioning system 150 may optimally provision the resources for the EDA tools, enforce any licensing agreements with the use of EDA tools on certain resources, and ensure that no resources incompatible with the EDA tasks are deployed in the public cloud infrastructure 110.

After the resources are provisioned, the cloud provisioning system 150 communicates 614 with the public cloud infrastructure to associate the provisioned resources with the user key. The association may be performed by storing the user key in the gateway server 124, tagging the provisioned resources with the user key or establishing other access control scheme that restricts access to the resource to the user with an access credential corresponding to the user key.

The cloud provisioning system 150 sends 618 a message to the user client device 170 indicating the identification (ID) of resources provisioned in the public cloud infrastructure 110. In one embodiment, the resource ID is an IP address of the gateway server 124. The user client device 170 receives 622 the resource ID from the cloud provisioning system 160. Then, the user client device 170 accesses 628 the provisioned resources using the access credential. In one embodiment, the access to all of the provisioned resources are accomplished via the gateway 124 provisioned in the public cloud infrastructure 110.

The user client device 170 then uploads 632 EDA information for the EDA tasks to the public cloud infrastructure 110. After the EDA information is uploaded to the public cloud infrastructure 110, the user client device 170 sends instructions to execute the EDA tasks on the provisioned resources. The EDA information may include, for example, netlist or other information associated with designing an IC device.

While executing the EDA tasks, additional resources may be provisioned to increase the number of EDA tasks processed in parallel. Further, resources already provisioned may be decommissioned to minimize the cost. After all of the EDA tasks are terminated, the results of the tasks are collected at the user client device 170. Then the session on the public cloud infrastructure is terminated to avoid incurring further leasing costs. Any user keys or EDA information in the public cloud infrastructure 110 are removed to prevent unauthorized access to the information.

The foregoing description of the embodiments has been presented for the purposes of illustration and description. It is not intended to be exhaustive or to limit to the precise form disclosed. Many modifications and variations are possible in light of the above teaching.

What is claimed is:

1. A method of provisioning computing resources in public computing infrastructure, comprising:
   receiving a request to provision computing resources in public computing infrastructure for a computing operation from a user, wherein the computing operation comprises an electronic design automation (EDA) operation;
   generating a command to provision the computing resources in the public computing infrastructure;
   sending the command to the public computing infrastructure using a provisioning credential for retention by an EDA tool developer;

associating the provisioned computing resources with an access credential for retention by the user and distinct from the provisioning credential; and sending identification of the provisioned computing resources to the user for the user to access the provisioned resources based on the access credential and the identification.

2. The method of claim 1, further comprising storing a public key associated with the user in the provisioned computing resources.

3. The method of claim 1, wherein the provisioned computing resources comprise at least one gateway server for storing a user key, the gateway server allowing the user responsive to determining that the user key corresponds to an access credential retained by the user.

4. The method of claim 1, further comprising:

storing a user key associated with the user; and sending the user key for storage in at least one of the provisioned computing resources, access to upload information and process information using the provisioned computing resources restricted to the user with an access credential corresponding to the user key.

5. The method of claim 1, further comprising determining the computing resources to be provisioned responsive to receiving the request to provision.

6. The method of claim 5, wherein the computing resources to be provisioned is based on an instance template defining default parameters for provisioning the computing resources.

7. The method of claim 1, further comprising:

storing provisioning credential for the user; and authorizing provisioning of the computing resources responsive to receiving a provisioning credential from the user matching the stored provisioning credential.

8. A provisioning system for provisioning computing resources in public computing infrastructure, comprising:

a communication module configured to receive a request to provision computing resources in public computing infrastructure for a computing operation from a user and send identification of provisioned computing resources to the user, wherein the computing operation comprises an electronic design automation (EDA) operation; and a provision handler configured to generate a command to provision the computing resources in the public computing infrastructure responsive to receiving the request, send the command to the public computing infrastructure using a provisioning credential for retention by an EDA tool developer, and associate the provisioned computing resources with an access credential for retention by the user and distinct from the provisioning credential, the user accessing the provisioned computing resources based on the access credential and the identification.

9. The provisioning system of claim 8, further comprising a database for storing a public key associated with the user in the provisioned computing resources.

10. The provisioning system of claim 8, wherein the provisioned computing resources comprise at least one gateway server for storing a user key, the gateway server allowing the user responsive to determining that the user key corresponds to an access credential retained by the user.

11. The provisioning system of claim 8, further comprising a database for storing a user key associated with the user, the user key sent to at least one of the provisioned computing resources to associate the provisioned computing resource with the access credential.

12. The provisioning system of claim 8, wherein the provision handler is further configured to determine the computing resources to be provisioned responsive to receiving the request to provision.

13. The provisioning system of claim 12, wherein the provisioning handler is configured to provision the computing resources based on an instance template defining default parameters for provisioning the computing resources.

14. The provision system of claim 8, further comprising a database for storing provisioning credential for the user, provisioning of the computing resources authorized responsive to receiving a provisioning credential from the user matching the stored provisioning credential.

15. A non-transitory computer-readable storage medium storing instructions when executed by a process in a provision system for provisioning computing resources in public computing infrastructure, cause the processor to:

receive a request to provision computing resources in public computing infrastructure for a computing operation from a user, wherein the computing operation comprises an electronic design automation (EDA) operation;

generate a command to provision the computing resources in the public computing infrastructure;

send the command to the public computing infrastructure using a provisioning credential for retention by an EDA tool developer;

associate the provisioned computing resources with an access credential for retention by the user and distinct from the provisioning credential; and send identification of the provisioned computing resources to the user for the user to access the provisioned resources based on the access credential and the identification.

* * * * *